June 5, 1928.

W. A. BRACKEN 1,672,600

AWNING

Filed Aug. 28, 1926    2 Sheets-Sheet 1

INVENTOR.
William A. Bracken
BY
Geo. F. Kimmel    ATTORNEY.

June 5, 1928.  W. A. BRACKEN  1,672,600
AWNING
Filed Aug. 28, 1926   2 Sheets-Sheet 2

INVENTOR.
William A. Bracken,
BY
Geo. P. Kimmel ATTORNEY.

Patented June 5, 1928.

1,672,600

UNITED STATES PATENT OFFICE.

WILLIAM A. BRACKEN, OF AUGUSTA, KANSAS, ASSIGNOR OF ONE-HALF TO WILLIAM B. JONES, OF AUGUSTA, KANSAS.

AWNING.

Application filed August 28, 1926. Serial No. 132,193.

This invention relates to awnings designed primarily for the glass panel doors of motor vehicles of the closed body type, but it is to be understood that an awning, in accordance with this invention, can be employed for any purposes for which it is found applicable, and the invention has for its object to provide, in a manner as hereinafter set forth, an adjustable awning including a flexible body normally in a rolled up state and capable when extended to be employed for sheltering or protecting purposes, as well as acting as a blind for the glass panel of a door.

A further object of the invention is to provide, in a manner as hereinafter set forth, an awning including means for detachably securing it in an extended position with respect to an automobile body and further for detachably securing it in position when extended to provide a blind for the glass panel of the door of the automobile body.

A further object of the invention is to provide, in a manner as hereinafter set forth, an awning including a flexible body having associated therewith means acting to normally maintain said body in a distended position with respect to the object with which the awning is attached.

Further objects of the invention are to provide, in a manner as hereinafter set forth, an awning for the purpose referred to which is simple in its construction and arrangement, strong, durable, thoroughly efficient in its use, conveniently extended when desired, spring controlled, readily installed with respect to an automobile body of the closed type, and comparatively inexpensive to manufacture.

With the foregoing and other objects in view the invention consists in the novel construction, combination and arrangement of parts, as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
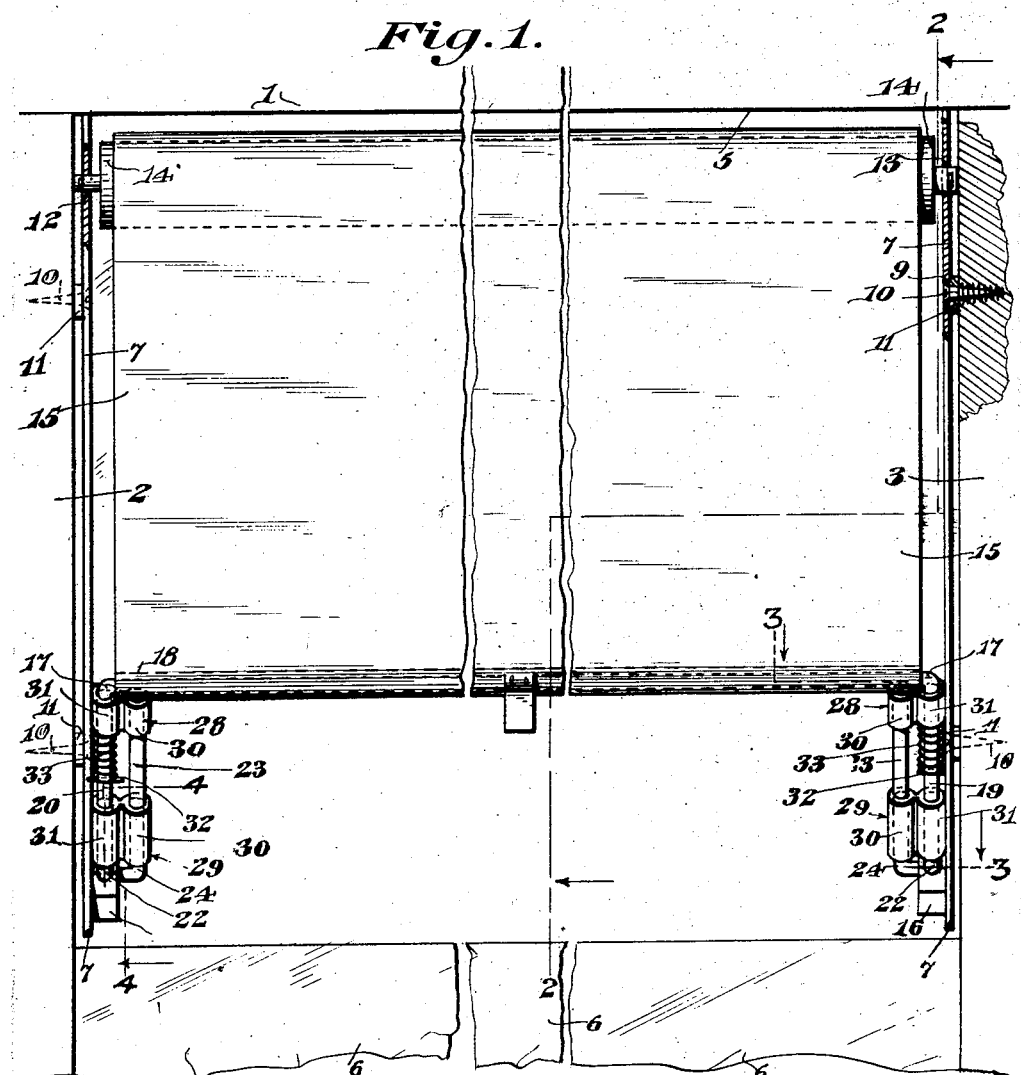
Figure 1 is a sectional elevation, broken away, of an awning in accordance with this invention, and with the awning extended and connected with an automobile body and opposing the door of the latter exteriorly thereof.

Referring to the drawings in detail 1 denotes a top and 2, 3 the side rails or bars of a door 4 forming an element of the body of an automobile of the closed car type. The door 4 has the upper portion thereof provided with an opening 5, which is closed by a vertically movable glass panel 6. The elements referred to are of known construction. An awning in accordance with this invention is adapted to be secured to the inner faces of the side bars or rails 2, 3 of the door 4 and positioned outwardly with respect to the glass panel 6.

Secured to the inner face of the side rail or bar 2, as well as to the outer side face of the side rail or bar 3, is a combined supporting and protecting member. As each of said members is of the same construction, but one will be described, as the description of one will apply to the other. Each of said members consists of an elongated strip of sheet metal of the desired gauge, length and width and said strip is indicated at 7, has its upper end abut against the lower face of the top bar or rail 1 and its outer edge flush with the outer edge of the side bar or rail. The inner edge of the strip 7 is positioned a substantial distance rearwardly of the glass panel 6. The strip 7 at its upper portion, which is indicated at 8 is of greater width than the remaining portion thereof. The strip 7 is provided with a pair of countersunk slots 9 through which extend hold fast devices 10 for connecting the strip or rather securing the strip to the side rail or bar of the door. The securing devices or rather hold fast devices which are in the form of screws, carry washers 11 which space the strip 7 an appropriate distance from the side rail or bar of the door to which the strip 7 is secured, see Figure 1. The strip 7 is of a length less than the height of the opening 5. One of the strips 7 at its enlarged upper body is formed with a cylindrical opening 12 and the other of said strips, at its enlarged portion 8, is formed with a polygonal-shape opening 13 and mounted in said openings is a spring-controlled roller 14 of known construction, to which is attached the flexible body portion 15 of the awning and said body portion 15 normally is rolled upon the spring-controlled roller 14 through the action thereof. The said spring controlled roller 14 normally tends to maintain the body portion 15 in an elevated position. The unwinding of the body portion 15 from off the roller 14 is had against the action of a controlling spring therefor, so that when said body portion is released the controlling spring in the roller 14 will automatically wind up the body portion 15.

Figure 4:
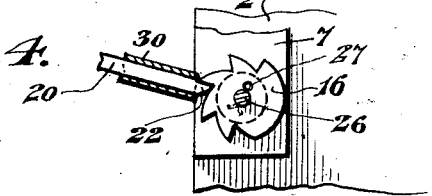
Figure 4 is a fragmentary view in sectional elevation illustrating the means for detachably securing the awning frame in set position.

Formed integral with each of the strips 7, at the lower end thereof, is a ratchet 16 and said ratchet 16 acts to maintain the awning in an extended position when it is employed for sheltering or protecting purposes and further acts or maintain the awning in an extended position when it acts as a blind for the glass shield or panel 6. The outer end of the body portion 15, is secured to the horizontal bar 17 of a yoke-shaped frame. The body portion 15 is extended around the bar 17 and secured together as indicated at 18, see Figure 2 whereby the outer end of the body portion 15 is connected with the bar 17. The longitudinally extending bars for the yoke-shaped frame are indicated at 19 and 20 and each has a beveled free end 22, see Figure 4 which associated with the ratchet 16 for the purpose of detachably securing the awning in an extended position. Associated with the rod 19, as well as the rod 20, is a pivot bar 23 having an angle-shaped rear end 24 which extends through the ratchet 16 and further extends in an opening 25 which registers with an opening 26 formed in the ratchet 16. The pivot rod 23 is connected with the strip 7 by a cotter pin 27. The ratchets 16 provide bearings for the angle-shaped ends 24 of the pivot rods 23. Each pivot rod 23 is connected to a longitudinal bar of the yoke-shaped frame by a pair of spaced coupling members 28, 29 and each of said members consists of a pair of tubular portions 30, 31, which are connected together. The pivot rod 23 extends into the tubular portion 30 of said members and each longitudinal bar of the yoke-shaped frame extends through the tubular portions 31 of said members, see Figure 3. Each longitudinal bar of the yoke-shaped frame is provided with a tranversely extending pin 32, and mounted on said bar and interposed between the pin 32 and the inner end of the tubular portion 31 of the member 28, is a coiled spring 33 which normally tends to maintain the beveled ends 22 of the bars 19 and 20 in engagement with the ratchets 16.

Figure 2:
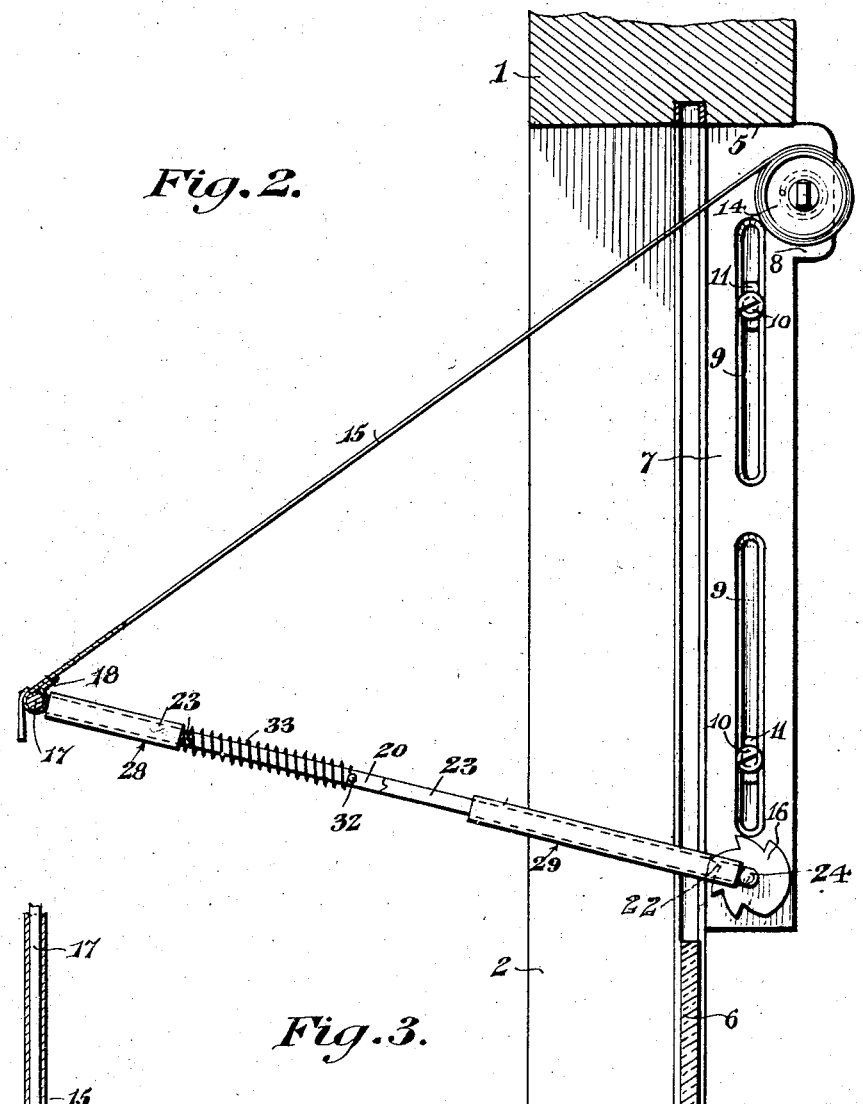
Figure 2 is a section on line 2—2 Figure 1.
Figure 3:
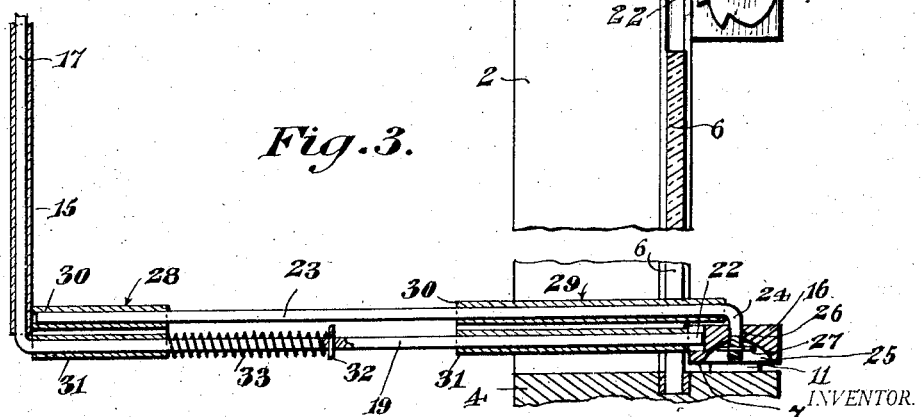
Figure 3 is a section on line 3—3 Figure 1.

The pivot rods 23 acts as means for hinging the yoke-shaped frame with the door of the vehicle and further act, in connection with the bars 19 and 20 to maintain the body portion in an extended position, as shown in Figure 2. If the awning is in the position as shown in Figure 2, by slightly shifting the same upwardly, the bars 19 and 20 will be moved from engagement with the ratchets 16 and the controlling spring for the roller 14 will wind up the body portion 15 and under such conditions carry the yoke-shaped frame, together with the pivot rods 23 to a vertical position. When the awning is in the position as shown in Figure 2, it is adjusted to a sheltering or protecting position, but if it be desired to use the awning as a blind, for the glass panel 6, the frame, together with the pivot rods 23 are shifted downwardly until they assume a vertical position and under such conditions the body portion 15 will be vertically disposed, relative to the door, and act as a blind for the glass panel 6. The beveled ends of the bars 19 and 20, coacting with the ratchets 16, will maintain the body portion 15 in a vertical position, until the said beveled ends 22 are disengaged from the ratchets 16, and when disengaged the roller 14 will automatically revolve to provide for the winding up of the body portion 15 and the shifting of the frame and pivot rods 23 to a vertical position above the ratchet 16.

It is thought the many advantages of an awning, in accordance with this invention for the purpose set forth, can be readily understood, and although the preferred embodiment of the invention is as illustrated and described it is to be understood that changes in the details of construction can be had which will fall within the scope of the invention as claimed.

What I claim is:

1. In a rolling awning construction of that type including an adjustable yoke shaped frame for the awning body, the combination of a pivot rod for and opposing the side arm of the frame, means for slidably connecting said arm to the pivot rod, a ratchet adapted to be secured to a window frame for engagement with the inner end of said arm to retain the yoke-shaped frame in different angular positions, said ratchet providing a bearing for said rod, and a controlling spring for and carried by said arm and coacting with said means for maintaining the inner end of said arm in engagement with the ratchet.

2. In a rolling awning construction of that type including an adjustable frame for the awning body, the combination of a pivot rod for and opposing one of the arms of the frame, means for slidably connecting said arm to said rod, said rod projecting inwardly with respect to the inner end of said arm and having a right angularly disposed inner terminal portion, a stationary ratchet for engagement by the inner end of the arm to retain the frame in adjusted positions, said ratchet forming a bearing for the said inner terminal portion of said rod, and a controlling spring for and carried by said arm and coacting with said means for maintaining the inner end of said arm in engagement with the ratchet.

3. In a rolling awning construction of that type including an adjustable frame coupled with the awning body, the combination of a support adapted to carry the means for winding the awning body, a ratchet fixed to said support, a rod having its rear end pivotally connected in said ratchet, means for slidably connecting the frame to said rod, and resilient means for detachably maintaining the frame in engagement with the ratchet.

4. In a spring controlled rolling awning construction of that type including a spring controlled adjustable yoke shaped frame for extending the awning body, the combination of a pivot rod for a side arm of the frame, means for slidably connecting such side arm to the pivot rod, and means arranged at the inner end of the pivot rod for automatic engagement by the inner end of said side arm to latch the frame in different angular positions against the action of the controlling spring of the awning structure.

5. In a spring controlled rolling awning construction of that type including a spring controlled adjustable yoke shaped frame for extending the awning body, the combination of a pivot rod for a side arm of the frame, means for slidably connecting such side arm to the pivot rod, and means arranged at the inner end of the pivot rod for automatic engagement by the inner end of said side arm to latch the frame in different angular positions against the action of the controlling spring of the awning structure, and means for limiting the sliding movement of such arm in an outward direction relative to the pivot rod.

6. In a spring controlled rolling awning construction of that type including a spring controlled adjustable yoke shaped frame for extending the awning body, the combination of a rod to oppose a side arm of the frame, a pivot for the inner end of the rod, means for slidably connecting such side arm of the frame to said rod, and a support for the pivot including teeth selectively and directly engaged by the inner end of such arm to latch the frame in different angular positions against the action of the controlling spring of the awning structure.

7. In a spring controlled rolling awning construction of that type including a spring controlled adjustable yoke-shaped frame for extending the awning body, the combination of a rod, a pivot means therefor, means for slidably connecting a side arm of said frame to said rod, and a support for said pivot means and formed with ratchet teeth selectively and directly engaged by the inner end of such arm to latch the frame in different angular positions against the action of the controlling spring of the awning structure.

In testimony whereof I affix my signature hereto.

WILLIAM A. BRACKEN.